United States Patent [19]
Chang et al.

[11] 3,950,266
[45] Apr. 13, 1976

[54] METHOD OF PRODUCING AN ANTIOXIDANT COMPOSITION FROM ROSEMARY AND SAGE

[75] Inventors: Stephen S. Chang, East Brunswick, N.J.; Biserka Ostric-Matijasevic, Forest Hills, N.Y.; Cheng-Li Huang, Piscataway; An-Li Hsieh, New Brunswick, both of N.J.

[73] Assignee: Rutgers Research and Educational Foundation, New Brunswick, N.J.

[22] Filed: Nov. 28, 1973

[21] Appl. No.: 419,715

[52] U.S. Cl. ............... 252/398; 426/542; 426/654; 426/655; 426/429
[51] Int. Cl.².. C09K 15/34; A23B 4/00; A23L 1/28
[58] Field of Search ............ 252/398; 426/179, 223, 426/228, 229, 429

[56] References Cited
UNITED STATES PATENTS

| | | | |
|---|---|---|---|
| 2,124,706 | 7/1938 | Maveety | 426/179 |
| 2,571,867 | 10/1951 | Hall | 426/228 |
| 2,571,948 | 10/1951 | Sair | 426/223 |
| 2,752,314 | 6/1956 | Clopton | 252/398 |
| 2,975,066 | 3/1961 | Baker | 252/398 |
| 3,071,475 | 1/1963 | Stohr | 426/228 |
| 3,542,653 | 11/1970 | Lowrey | 426/228 |
| 3,681,090 | 8/1972 | Huth | 426/229 |
| 3,732,111 | 5/1973 | Berner | 252/398 |

*Primary Examiner*—Benjamin R. Padgett
*Assistant Examiner*—Donald P. Walsh
*Attorney, Agent, or Firm*—Cooper, Dunham, Clark, Griffin & Moran

[57] ABSTRACT

Antioxidant compositions, useful for preventing deterioration of oils and fats in food products, are prepared by a two-stage extraction from rosemary or sage. A crude product is first extracted from the plant material with a low-boiling solvent separable by evaporation, and is then found to be separable from contaminants that cause objectionable taste or odor, by vacuum steam or molecular distillation, with the antioxidant in a suitable oil carrier, and with the contaminants removed in vapor state. A special purification of the extract, for a product of very high purity except for some flavor or odor for which distillation may be needed, is attainable by chromatography, wherein the antioxidant material favors solvents of greater polarity than solvents in which other materials are eluted. The new antioxidant compositions are not only widely useful but appear to have unusual value in respect to vegetable oils and in respect to oils used in deep frying, and also are found of special value for inhibiting certain flavor and odor effects that occur in soybean oil.

11 Claims, 2 Drawing Figures

METHOD OF PRODUCING AN ANTIOXIDANT COMPOSITION FROM ROSEMARY AND SAGE

BACKGROUND OF THE INVENTION

This invention relates to the production and use of antioxidant compositions, including what are believed to be new products having unusual advantages in preventing or inhibiting the deterioration of fats and oils, particularly in food materials, that is caused by oxidation. As is well known, fats and oils become rancid or otherwise unpleasant as to flavor or odor by reason of oxidation effects. A number of chemical compounds have been employed for avoiding or reducing these effects, i.e. so that the fats and oils, or foods containing them, may be kept for longer periods of time, but such agents have not been entirely satisfactory or effective in many cases. Furthermore, they are chemical products not derived from or identical with material of natural food classifications, and there has been some question about the advisability of using them.

Principal antioxidants of the above kinds heretofore employed have included so-called BHA (butylated hydroxyanisole) and so-called BHT (butylated hydroxytoluene), and so-called TBHQ (tertiary butylhydroquinone), as well as some other chemicals of which one example is propyl gallate (PG). While these materials have been quite effective in animal fats, such as lard, they are much less useful in some other applications. Their volatility and tendency to decompose at high temperatures make them not entirely suitable for deep fat fried foods. Indeed their usefulness for the stability of vegetable oils is less than satisfactory. For example, they are not entirely effective in protecting certain off-flavor development such as the so-called reversion flavor that occurs, with passage of time, in soybean oil. For these and other reasons there has been a need for improvement in the field of antioxidants, especially those to be used with food materials that comprise or consist of fats or oils.

It has heretofore been found that antioxidant properties are possessed by certain natural vegetable materials in the class sometimes identified as herbs, and particularly in the specific plants rosemary and sage, which are commonly used as spices. Indeed it has been found that by extracting the fresh or dried leaves or like parts of these plants, such as rosemary, by the use of alcohol or similar readily volatile solvent a somewhat concentrated but crude preparation may be obtained which has considerable antioxidant effect. Procedures have been proposed for making such crude extract, in most instances directly from the leaves, stems or the like of the natural spice, or in some cases by alcohol treatment of the plant material after the oil of the spice (present in very minor proportion) has been substantially removed by steam distillation. The resulting crude extract in alcohol or like liquid has been evaporated (sometimes after some bleaching with active carbon) to yield a solid product. While such product can be considered as in some respect refined in contrast with the original leaves and stems of the spice plant, and indeed although such products have been described as purified and of substantially less taste or odor than the natural spice, these materials have not by any means been fully freed of the characteristically pungent, natural aroma and flavor, with some bitterness, of the basic spice material. Accordingly, although such preparations have been found to provide antioxidant properties, and one such product is currently available on the market, the use of these materials is limited to situations where the basic flavor of the spice is wanted or at least tolerated.

So far as can be ascertained, essentially tasteless and odorless antioxidant materials are limited to substances such as those of the manufactured chemical character mentioned above, and indeed it can be said that there is a real need in the food industry for an antioxidant extracted from natural food stuffs, that has superior properties and can serve a wide range of uses.

SUMMARY OF THE INVENTION

The present invention is predicated on the discovery that an unusually effective, essentially tasteless and odorless antioxidant composition, fully equal and indeed superior to the above-described chemical antioxidants, may be produced from the natural spice materials identified above, for example rosemary, by novel and unexpectedly advantageous procedure. It is further found that the resulting antioxidant substance has unusual utility, for the protection and continued stabilization of a wide variety of food materials, including vegetable oils such as soybean oil and fat-containing food materials that have been processed at relatively high temperatures. A present indication is that results of these kinds, including the production of a highly effective antioxidant composition, are obtainable from sage plant material as well as from rosemary and the procedures appear substantially the same with the two sources. Under these circumstances, to avoid repetition as to the method of preparation, the present description will deal chiefly with the rosemary plant, both by way of example of excellent results obtainable from either rosemary or sage, and by way of representing a very useful embodiment.

An essential feature of the invention resides in novel procedure whereby the unusual antioxidant composition is obtained. Basically the process comprises two stages, being first the extraction of rosemary plant material with a suitable solvent, very advantageously an organic solvent of low boiling point, such as methanol, or more generally a liquid of similarly suitable nature such as hexane, ethyl ether, dioxane, or other alcohol. While this extraction yields a somewhat refined material having antioxidant properties, and indeed represents the state of the art in this respect as explained above, the extract is still relatively crude, even though it may have been bleached with active carbon. It has now been discovered that a truly superior product, usefully free of the characteristic taste or odor of the spice, may be achieved by a second stage of purification, preferably after separation of the crude extract material from its solvent, e.g. by evaporation of the latter. More particularly, the extract is treated to separate the antioxidant material in a physical state which selectively differs from the state of the material that contaminates it, i.e. the material that provides the unwanted, spicy or bitter taste and flavor.

It has specifically been found that a very advantageous selective process is attained by establishing the contaminating material in vapor state while the antioxidant material is established in non-vapor state. Thus, for instance the crude extract of the first stage can be dissolved in a relatively high boiling solvent such as cottonseed oil, and then this material, i.e. containing the antioxidant values and the contamination, may be subjected to suitable distillation treatment, such as vacuum steam distillation. The temperature of the latter can be fixed at a point where the antioxidant material remains in solution in the oil, yet the unwanted contaminating material is evaporated, usually with some part of the oil, and may be separately condensed or otherwise removed at a locality remote from the body of solution under treatment. In this fashion an oil solution of antioxidant material is achieved, which is found to constitute a new antioxidant product, highly purified and having extraordinary utility.

Alternatively the distillation-type treatment, e.g. using vacuum steam distillation, may be effected at a sufficiently high temperature to carry off the antioxidant material as well as the contamination. In such case the process is of a fractionating character in the sense that the antioxidant substance can be condensed at condensing locality having a temperature suitable for deposit of the antioxidant but higher than a value for condensation of the contaminants, thus producing a yield of the antioxidant as a brown viscous liquid, essentially free of flavor and odor. Another alternative is so-called molecular distillation, where the oil solution of the crude extract is heated as a thin film on a surface that closely faces a condensing surface, under very high conditions and with suitable temperature controls, whereby the tasteless and odorless antioxidant, in oil base, is condensed on the surface, while the contaminating material remains volatile and passes out of the chamber.

Another procedure, found to be desirably operative, and indeed analytically advantageous in indicating the chemical individuality of the antioxidant substance or substances, is chromatographic separation. It is found that the crude extract, if dissolved in a suitable solvent, may be applied, for instance, to an appropriate packed column, which is then subjected to elution as by solvents of increasing polarity. Performed in stepwise fashion, this results in successive fractions, with the more specific result that the antioxidant material, of high chemical purity, is concentrated in a fraction or fractions of higher polarity, and is thus usefully separated from contaminating materials although not as completely free of odoriferous compounds as after distillation. At present, the distillation procedures (especially those using vacuum steam distillation) are deemed desirable for general usefulness of the product and in most cases (without chromatography) provide enough practical purification.

The substances can be bleached, with some removal of bitterness of taste, by using active carbon or other adsorbent material. Such bleaching can be achieved with respect to the crude extract, as in the case of previous production of such an extract, or the final product of the present invention may be subjected to a bleaching operation.

As will be explained more below, the new antioxidant compositions of the invention are unusually effective in preventing oxidative deterioration of fats and oils in a manner at least equal and for many purposes superior to that of the previous chemical antioxidants. Indeed the new preparations are found to be useful in stabilizing food products that are subjected to high temperature cooking operations involving the presence or addition of a quantity of oil or fat, so that the cooked product has much longer keeping quality, in contrast to attempts to use prior chemical agents as antioxidants in such circumstances. Moreover, certain commonly occurring deterioration in soybean oil, particularly a flavor and odor development that is not entirely impossible to accept but is nevertheless generally undesirable, can be greatly reduced or avoided by inclusion of the present compositions. This is in contrast to chemical antioxidants which do not seem to effectively avoid this reversion flavor in soybean oil. Further details of the preparation of the compositions and of their properties and uses, as well as other characterizations and identifications, e.g. both as to rosemary and sage, are brought out hereinbelow.

DETAILED DESCRIPTION OF THE INVENTION

Figure 1:
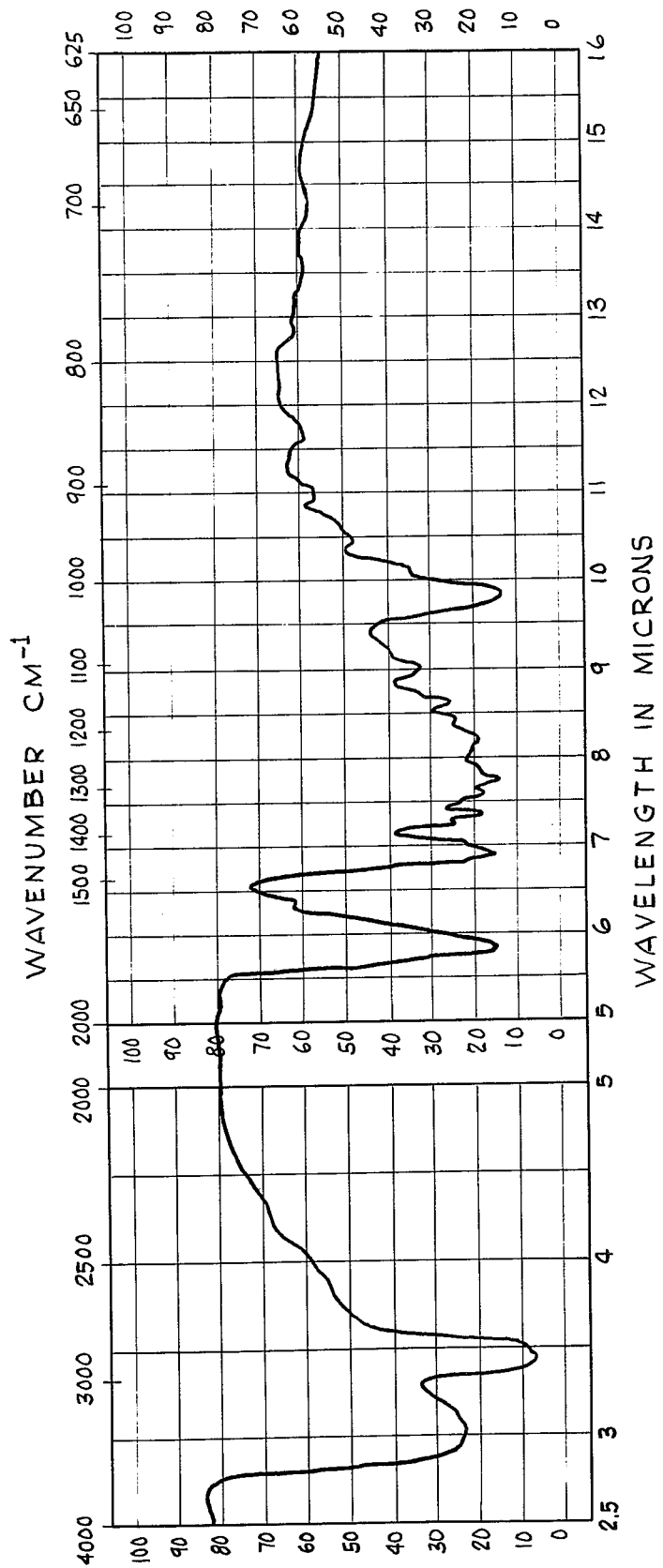
FIG. 1 is an infrared spectrum of an antioxidant composition representing a product of the invention, purified by chromatography and identified as Fraction IV in a sequence defined below.

As stated, the new product is most preferably obtained from the herb rosemary, such as the plant commonly identified as *Rosmarinus officinalis L*. Conveniently, the leaves, stems, and indeed flowering parts of the plant may be used, e.g. as are employed for food spice purposes, and this material is conventionally available in dried form, often more or less reduced to a powder. Alternatively, the fresh plant material can be employed, for extraction and treatment in the present process, but fully effective results are obtainable with the dried spice. The sage employed for production of antioxidant material in the examples hereinbelow consisted of dried leaves and stems of *Salvia officinalis L*., being the species commonly used for seasoning purposes. It is understood that other species of sage that are employed for spice use in foods, may likewise be subjected to the present treatment for extraction of antioxidant values, for instance the species named *Salvia triloba L*. (Greek sage) and *Salvia lavandulaefola Vahl* (Spanish sage). In the various identifications herein, the abbreviation L. stands for Labiatae. Again, the fresh plant, or preferably the dried plant material, e.g. leaves, stems and the like, may be used in the case of sage as the case of rosemary.

As a first part of a number of examples of the process of preparing the antioxidant material, dried rosemary in fine powder was subjected to extraction by a variety of low boiling solvents ranging from hexane to methanol. In each instance the procedure was as follows:

Fifty grams of rosemary in fine powder were extracted with 250 milliliters of the solvent at its boiling point for 2 hours. The mixture was filtered. The residue could be extracted for several times with additional solvent to yield further quantities of antioxidant. The filtrate, after the removal of solvent (as by boiling if off), yielded the crude antioxidant. It could be purified by washing with hot water and then bleached (in fresh solvent) with active carbon to produce, ultimately, a light yellow-colored powder.

As one example, when ethyl ether was used as the solvent the yield of the crude antioxidant by extraction from three to five times was 9.35% to 14.31% by weight of the rosemary used.

The antioxidant character of the crude extracts obtained with the various solvents was tested by conventional methods, which include determining the so-called peroxide value of the given oil or fat with which the antioxidant is mixed, after various time intervals and with the so-treated oil or fat held at a suitable, somewhat elevated temperature, such as 60°C. It will be understood that the deterioration (by oxidation) of oils and fats, causing rancidity or other undesirable qualities, is initiated or accompanied by the appearance of oxygen in what may be measured as a peroxide group in the oil or fat. Hence by appropriate technique, widely used in the food industry, the quality of the oil or fat, with respect to oxidative deterioration may be measured by its peroxide content, i.e. its peroxide value, such that higher values represent increasingly worse conditions whereas substantial avoidance of or delay in increase of peroxide values represent good keeping effect of the antioxidant.

In these tests of the first stage of the process with various solvents, each specimen of the crude antioxidant, from a single or first extraction in each case, was examined as to yield, e.g. in percent of the antioxidant on the weight of the dried rosemary employed. That is, the yield was determined respecting the total extract, as described, after washing with warm water and bleaching with carbon. In each case, the antioxidant property, of the produced extract as just described, was tested with prime steam lard, e.g. by mixing the latter with 0.02% (by weight) of extract, the mixture being allowed to stand for various numbers of days at 60°C. It will be understood that this relatively very small amount of antioxidant was not only found effective but is of the order of antioxidant chemical heretofore employed for similar purposes. The results of these tests are shown in the following Table 1, where it will be understood that the peroxide values were determined (in a recognized manner) in milli-equivalents per kilogram.

TABLE 1

YIELD OF FIRST EXTRACTION OF ROSEMARY WITH SOLVENTS OF INCREASING POLARITY AND THE ANTIOXIDANT PROPERTY OF THE EXTRACTS

| | | Peroxide Value* of Prime Steam Lard After Days at 60°C (with 0.02% of the extract added) | | | |
|---|---|---|---|---|---|
| Solvent | Yield (%) | 0 | 4 | 7 | 11 |
| Hexane | 1.6 | 0.2 | 1.5 | 1.1 | 2.6 |
| Benzene | 2.5 | 0.2 | 1.0 | 1.2 | 2.2 |
| Ethyl Ether | 2.5 | 0.2 | 0.6 | 1.0 | 1.6 |
| Chloroform | 2.5 | 0.2 | 1.5 | 1.4 | 2.9 |
| Ethyl Dichloride | 2.3 | 0.2 | 1.0 | 1.2 | 1.4 |
| Dioxane | 3.6 | 0.2 | 1.4 | 1.7 | 2.0 |
| Methanol | 5.3 | 0.2 | 1.5 | 1.6 | 1.8 |
| Prime Steam Lard With No Additive | | 0.2 | 3.7 | 4.5 | 38.8 |

*in meq./Kg.

As will be noted, the various crude extract materials were highly effective in preventing oxidation of the lard, in contrast to the situation of the untreated fat. In the latter a peroxide value of 38.8 was reached after 11 days, in comparison with values of the order of 1.4 to 2.9 for the extract-treated lard.

Tests showed that the crude antioxidant extract from rosemary was highly effective when used at 0.02%, based by weight on the fat or oil treated. Effective results, however, were obtained with much lower concentration, e.g. 0.005 as shown by the following examples of tests in Table 2. In these tests the crude extract, e.g. as derived by extraction with ethyl ether and duly washed and bleached, was tested at two levels, and likewise comparison tests were made with a specific commercial preparation, that has been regarded as very effective among available antioxidants. For convenience this specific preparation is sometimes identified herein as Prior-Art Product or in abbreviated form as "P-A Prod." The composition of this product (in a suitable oil carrier) is given in the note to Table 2, wherein PG stands for propyl gallate. It will be understood that further references herein to the selected prior art product or to P-A Prod. are intended to mean a preparation having this composition.

TABLE 2

EFFECTIVE LEVEL OF CRUDE ANTIOXIDANT EXTRACTED FROM ROSEMARY AS COMPARED WITH PRIOR ART

| | | Peroxide Value** of Prime Steam Lard After Days at 60°C | | | |
|---|---|---|---|---|---|
| | | 0 | 5 | 8 | 12 |
| No Additive | | 1.3 | 9.6 | 16.4 | 27.2 |
| 0.02% | Rosemary Extract | 1.3 | 2.1 | 1.5 | 1.8 |
| 0.005% | Rosemary Extract | 1.3 | 3.8 | 4.2 | 7.0 |
| 0.02% | P-A Prod.* | 1.3 | 2.3 | 1.7 | 1.9 |
| 0.005% | P-A Prod.* | 1.3 | 4.0 | 4.9 | 7.3 |

*P-A Prod. is a most effective commercial antioxidant preparation containing 10% BHA, 10% BHT, 6% PG and 6% citric acid.
**meq/Kg.

It may be noted that the crude extract was also tested for its antioxidant value in other fats and oils, as for example chicken fat, sunflower oil and corn oil. The results, again in some cases in comparison with the prior art, are given in the following Table 3. The extract had been prepared by using ethyl ether, although comparable results are obtainable with products of extraction with other solvents.

TABLE 3

ANTIOXIDANT EFFECT OF ROSEMARY EXTRACT IN CHICKEN FAT, SUNFLOWER OIL, AND CORN OIL

| | | Peroxide Value* After Days at 60°C | | | | | | |
|---|---|---|---|---|---|---|---|---|
| Sample | Additive | 0 | 1 | 3 | 4 | 5 | 6 | 8 |
| Chicken Fat | None | 0.3 | 6.4 | 25.2 | — | — | — | — |
| | 0.02% Rosemary Extract | 0.3 | 5.1 | 9.8 | — | — | — | — |
| Sunflower Oil | None | 0.4 | — | 5.4 | — | — | 32.3 | 63.3 |
| | 0.02% Rosemary Extract | 0.4 | — | 3.2 | — | — | 15.8 | 19.7 |
| | 0.02% P-A Prod. | 0.4 | — | 3.5 | — | — | 32.4 | 42.9 |
| Corn Oil | None | 0.9 | — | 3.2 | — | — | 9.8 | 22.1 |
| | 0.02% Rosemary Extract | 0.9 | — | 2.8 | — | — | 4.3 | 9.6 |
| | 0.02% P-A Prod. | 0.9 | — | 3.1 | — | — | 6.2 | 15.2 |

*meq/Kg.

It will be observed that in several instances of comparison the rosemary extract was unusually effective for the vegetable oils.

By way of example of the second stage of the process of the present invention, including also a bleaching step, the following operations were performed with the separated, dried crude extract derived by first-stage treatment using ethyl ether. Ten g. of the crude antioxidant thus extracted from rosemary were dissolved in 100 ml. of ethanol at 60°C. Active carbon, as much as 20 g., was added. The mixture was stirred at 60°C for 15 minutes and then filtered. The filtrate was freed from the solvent (by evaporation of the latter) to yield 8 g. of the bleached antioxidant (approximately 80% yield).

Two g. of the bleached antioxidant in fine powder were suspended in 200 ml. of cottonseed oil. The suspension was steam distilled at 90°–95°C. under a vacuum of 0.01 mm. for 3 hours, using steam corresponding to 5% off the weight of the oil. The deodorized product, remaining in the vessel after the distillation carried off the contaminants, was an oil solution of the antioxidant. It was allowed to cool to room temperature under vacuum, e.g. a similarly low pressure of less than 1 mm.

Another sample of the bleached rosemary extract in oil solution in a suitable vessel was vacuum steam distilled at 155°C. for 2 hours, leaving a very highly purified antioxidant in oil solution, in the vessel.

Another sample of the bleached rosemary extract was vacuum steam distilled at 180°C. for 2 hours. At this temperature, a portion of the antioxidant, as a brown viscous liquid, was distilled over as distillate. Its amount corresponded to 12.3% of the extract added to the oil. It was easily recovered by condensing it on a suitable surface at a temperature at which steam cannot be condensed under vacuum, such as approximately 90°C. It was apparent that the contaminating material remained in vapor state at such temperature and was carried off.

The oil solution containing 1% of the rosemary extract (e.g. as remained in the vessel in the foregoing examples) has practically no odor and taste after the bleaching and vacuum steam distillation, particularly when the latter was carried out at the higher temperatures. Although this 1% solution is a useful form of additive (since only 1 part in 50 of it is needed in a fat to be protected), concentrations of 10% to 25% appear more practical as commercial antioxidant products.

The distillate collected when the oil solution was vacuum steam distilled at 180°–185°C. was dissolved in cottonseed oil at 0.1% concentration. The solution was also practically odorless and tasteless. As was desired, the odorless and tasteless preparations thus obtained, as well as those obtained by distillation at temperatures where the antioxidant was not vaporized, retained their antioxidant activities, as shown in Table 4. These were tests of treatment of prime steam lard, as previously described.

TABLE 4

ANTIOXIDANT ACTIVITY OF ODORLESS AND TASTELESS ROSEMARY EXTRACT PREPARED BY VACUUM STEAM DISTILLATION

| Additives | Peroxide Value* of Prime Steam Lard After Days at 60°C | | | | |
|---|---|---|---|---|---|
| | 0 | 5 | 8 | 12 | 19 |
| None | 1.1 | — | 13.6 | 30.3 | 63.0 |
| 0.02% of Bleached Rosemary Antioxidant Deodorized at 150°C | 1.1 | — | 3.3 | 3.8 | 6.1 |
| 0.02% of Bleached Rosemary Antioxidant Deodorized at 180°C | 1.1 | 2.8 | 3.5 | 4.8 | 9.4 |
| Ditto +0.05% Ascorbic Acid | 1.1 | — | 1.8 | 2.0 | 2.9 |
| 0.02% of Distillate of Rosemary Extract | 1.1 | 2.3 | 3.1 | 5.6 | 8.5 |
| Ditto +0.05% Ascorbic Acid | 1.1 | — | 2.8 | 2.9 | 3.2 |
| 0.02% P-A Prod. | 1.1 | — | 2.7 | 5.3 | 7.2 |

*meq/Kg.

Although it is convenient to perform the bleaching operation, most effectively with active carbon or usefully with another decolorizing adsorbent (such as activated clay or silicic acid) upon the extract in solution as obtained in the first step, similar bleaching may also be effected respecting the refined and purified product of the second step. Thus the deodorized product in the oil as a vehicle may be subjected to bleaching with active carbon or other appropriate agent such as just mentioned. This may be a second, supplementary bleaching, or it may serve as the sole bleaching treatment.

The solvent or carrier for the crude extract in the distillation operation and thus preferably the solvent for the purified and deodorized product of antioxidant (where the preparation is obtained as an oil or like solution) has been exemplified as cottonseed oil. Other chemical compounds with high boiling point, preferably compounds in which the extract material can be dissolved, are useful for this stage. Examples of other such materials are propylene glycol, butylene glycol, and other oils or fats such as coconut oil, hydrogenated soybean oil, beef tallow, corn oil, sunflower oil, lard, peanut oil, and the like. Most desirably, if the antioxidant composition is produced for ultimate use while dissolved in this type of solvent, the latter should preferably be a natural food-type material or one accepted as such.

Although the exact chemical composition of the antioxidant material or materials as produced in accordance with the present invention has not been elucidated, it appears that these are not compounds that have heretofore been available and employed for antioxidants, such as BHA and BHT. The substance or material, whether derived from rosemary or sage, appears to consist of a compound or compounds having a point of vaporization appropriate for the operations of the second stage wherein the contaminants are separated in vapor state. Likewise, with the use of a solvent boiling at a relatively low temperature, for example not substantially higher than about 100°C., recovery of the crude solid extract from the first stage of the process is a simple matter of evaporation of the solvent. As stated, it is found that in the second stage the contaminating material in the crude extract can be vaporized, usually with some of the oil base, by vacuum steam distillation at temperatures below vaporization of the antioxidant and will remain in vapor state at higher temperatures. Hence separation of the pure antioxidant material, either by condensation or by remaining in nonvaporized state, is readily achieved relative to the vaporized contaminants. It may be noted that among the several examples of low-boiling solvents for the first stage, the normal boiling points (at atmospheric pressure) range from 35°C. for ethyl ether to 101°C. for dioxane.

A further mode of producing the purified antioxidant material, and thus a further example of the second stage of the invention, embraces subjecting the oil solution of crude extract to molecular distillation. This involves causing the solution to pass over a heated surface in a thin film, e.g. a film falling on a vertical or substantially vertical surface. The heated surface is faced by a condensing surface or substrate, conveniently close to it as within a few cm. or less. Provision is made, as is usual in this type of distillation, for collection of the liquid distillate from the condensing substrate. The latter substrate is maintained at a suitable temperature which is below the condensing value for the desired antioxidant material at the low pressure involved, but is nevertheless higher than the condensation points of the contaminating substances.

One actual procedure of this example was as follows: the antioxidant, in amount of 1.78 g., extracted from rosemary with ethyl ether and bleached with active carbon was dissolved in 178 g. of cottonseed oil. The oil solution was then molecularly distilled with a falling film still under a vacuum of 20 microns (0.02 mm.). At 125°C., 0.76 g. of distillate was obtained. The residual oil solution was distilled again at 165°C., and 0.25 g. of distillate was obtained. The residual oil solution was finally distilled for the third run at 185°C. and 0.72 g. of distillate was obtained.

The total distillate collected and the residue of extract remaining in the oil together amounted to more than the bleached rosemary extract added to the cottonseed oil. This was because the cottonseed oil itself contained some components such as tocopherol, sitosterol, and free fatty acids which were distillable under the conditions used, but which in character and amount (a relatively minor amount) would not affect the utility of the product.

The distillate at 125°C. had a slight odor and no taste. The distillates at 165°C. and 185°C., as well as the residual oil solution, had practically no odor and no taste. However, the odorless and tasteless products did retain their antioxidant properties, as shown by the tests reported in Table 5.

TABLE 5

ANTIOXIDANT PROPERTIES OF ODORLESS AND TASTELESS ROSEMARY EXTRACT PREPARED BY MOLECULAR DISTILLATION

| Additives | | Peroxide Value* of Prime Steam Lard after Days at 60°C | | |
|---|---|---|---|---|
| | | 0 | 7 | 13 |
| None | | 0.9 | 36.5 | 44.0 |
| 0.02% | of Molecular Distillate at 125°C | 0.9 | 2.3 | 7.6 |
| 0.02% | of Molecular Distillate at 165°C | 0.9 | 4.3 | 16.5 |
| 0.02% | of Molecular Distillate at 185°C | 0.9 | 3.6 | 7.4 |
| 0.02% | of Extract in the Oil Solution after Molecular Distillation** | 0.9 | 4.1 | 8.9 |

*meq/Kg.
**Estimated value of the amount of actual antioxidant employed, when using 7.2 g. of the cottonseed oil solution remaining after the three runs of molecular distillation A further process of separating the relatively pure, active antioxidant involved chromatography, specifically liquid chromatography, by elution of the crude extract from a suitably packed column, utilizing liquids of successively greater polarity, i.e. as solvents for the material in the column.

In this example, the ethyl ether extract of rosemary, after bleaching with active carbon, and amounting to 1.96 g. of dry, crude extract, was dissolved in 7 ml. of chloroform. This solution was then applied to a column of 1 inch diameter (inside), and 23 inches tall, packed with fine granular silicic acid. The column was then subjected to elution by stepwise gradient elution, using increasingly polar solvent liquids (and mixtures) in the range from pure hexane to pure ethyl ether, and a further, final stage of pure methanol which was found not important. That is: the column was eluted first with pure (100%) hexane, then with successive mixtures of hexane and ethyl ether, containing decreasing proportions of hexane and increasing proportions of ethyl ether and finally reaching 100% ethyl ether. A further elution was methanol, as a solvent of still greater polarity, was performed, but it was found that nearly all of the desired purified antioxidant was removed with the hexane-ethyl ether (20% or more of the latter) and ethyl ether elutions. Throughout all of these successive operations, fractions were thus collected from the foot of the column and were denoted as being either from a single elution or as combined from a defined series of stepwise varying elutions (i.e. in one part of the series progressing toward a more polar solvent condition), as found necessary to achieve a significant quantity of eluate.

The fractions were identified by Roman numerals, in order of operation. Numbers I, II and III (being hexane-ethyl ether proportions respectively, in percent, 100–0, 95–5 and 90–10) were found of little significance as to the desired product, and could be considered as separating the contaminating material. They respectively represented 0.10 g., 0.22 g., and 0.07 g. of the original crude extract. Although as is often the case in procedures of this sort with mixtures of a multiplicity of components the separation was not strictly clear-cut (between contaminants and antioxidants), it was found that substantially all of the recoverable antioxidant product appeared in fractions IV and V. Fraction IV, 0.36 g., amounted to 18.4% of the total extract, and was eluted with a mixture consisting of 80% hexane and 20% ethyl ether. The more polar fraction V, total 0.97 g., amounted to 49.9% of the total extract and was eluted by a succession of several solvent mixtures, ranging, in successive order of increasing ethyl ether content (greater polarity), from 60% hexane - 40% ethyl ether to 0% hexane - 100% ethyl ether. Of the sequence from I to V, the fractions of greater polarity, numbers IV and V, can be identified by their infrared spectra in FIGS. 1 and 2. A further elution made with methanol yielded a fraction numbered VI, 0.23 g., that did not reveal significant purification of the antioxidant and was disregarded.

The antioxidant properties of fraction IV and the companion fraction of higher polarity, number V, were tested in the manner of other products described above, and were found to be even stronger than the crude rosemary extract, as shown by such tests, reported in Table 6.

Figure 2:
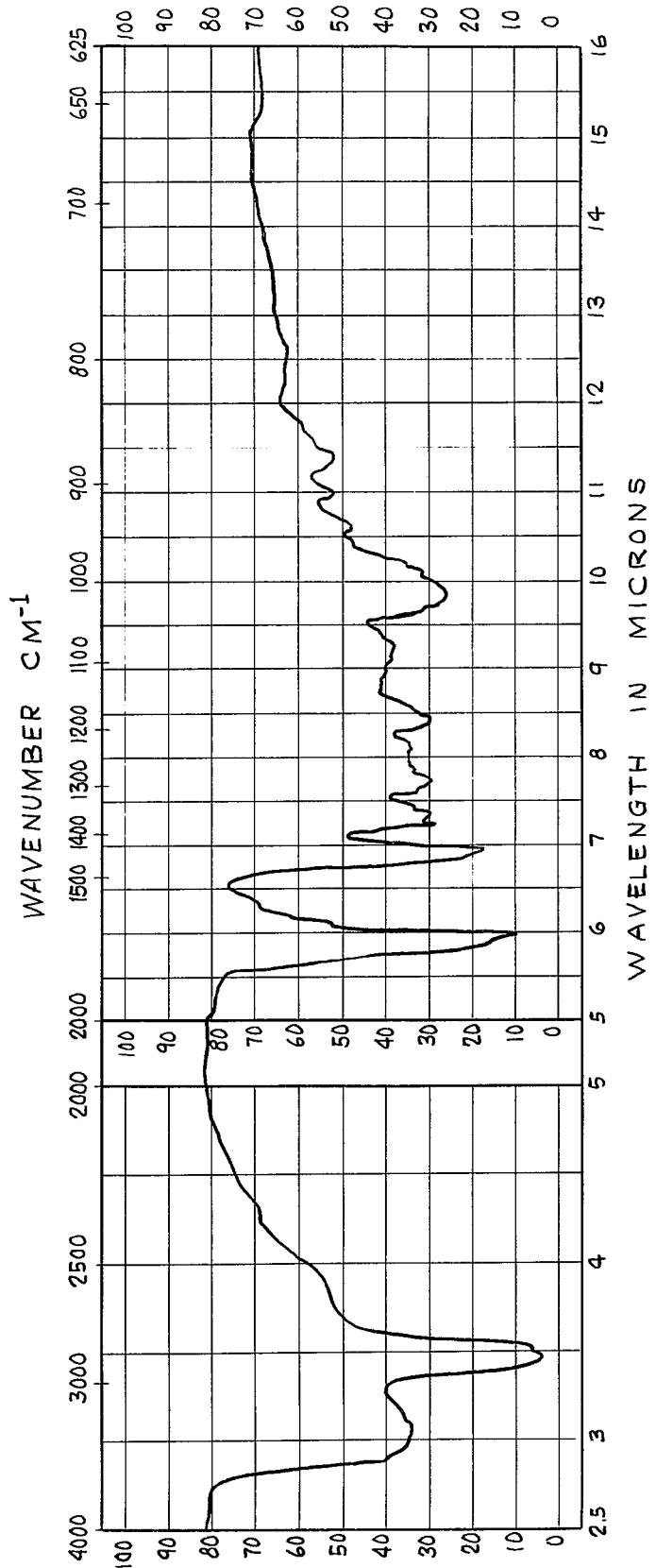
FIG. 2 is a similar infrared spectrum of an antioxidant composition of the invention also derived by chromatography, being denoted Fraction V (below) in a solvent of still greater polarity than that of Fraction IV.

Chromatography appears to yield high chemical purity of the antioxidant, especially in separation from nonodoriferous substances (which greatly preponderate among the contaminants). There can be a preceding or following step of distillation, if desired, for complete purification as to odor.

the present invention and obtainable by one or another of the various distillation and chromatographic operations described above, may comprise a single dominant compound (the same for all) or may very well consist of a group of compounds, presumably present as a mixture, that are chemically very similar to each other, for example as may be indicated by the spectra of FIGS. 1 and 2.

As mentioned above, chemical antioxidants that are now widely used have not been very satisfactory with respect to oils and fats that have been treated at high temperature, as when the treated oil or fat is used for making fried products, notably by deep frying, and the fried products are then sought to be stored for some time. In contrast, for instance, foods that have been deep fat fried in oils containing the present antioxidant prepared from rosemary have better stability than fried in oils with no antioxidants or with commercial antioxidants available on the market (Table 7). In addition, soybean oil containing 0.02% bleached, and 180° C. deodorized rosemary antioxidant, had a significantly lower fishy or otherwise objectionable taste or odor when heated to the frying temperature of 185°C., than the same soybean oil with no additive. In the tests of Table 7, potato chips were deep fried in various untreated oils as noted and also in the same, antioxidant-

TABLE 6

ANTIOXIDANT PROPERTIES OF LIQUID CHROMATOGRAPHIC FRACTIONS OF BLEACHED ROSEMARY EXTRACT

| Additives | Peroxide Value* of Prime Steam Lard After Days at 60°C | | | | |
|---|---|---|---|---|---|
| | 0 | 5 | 8 | 12 | 19 |
| None | 0.51 | 3.5 | 6.5 | 17.9 | — |
| 0.02% of Fraction IV | 0.51 | 1.4 | 1.2 | 1.2 | — |
| 0.01% of Fraction IV | 0.51 | 1.3 | 1.2 | 1.3 | — |
| 0.005% of Fraction IV | 0.51 | 1.2 | 1.3 | 1.6 | — |
| 0.02% of Fraction V | 0.51 | 1.9 | 2.8 | 3.3 | — |
| 0.01% of Fraction V | 0.51 | 2.3 | 2.6 | 4.4 | — |
| 0.005% of Fraction V | 0.51 | 2.8 | 2.6 | 4.6 | — |
| None | 1.3 | 9.6 | 16.4 | 27.2 | 36.2 |
| 0.02% Bleached Rosemary Extract | 1.3 | 2.1 | 1.5 | 1.8 | 2.1 |
| 0.005% Bleached Rosemary Extract | 1.3 | 3.8 | 4.2 | 2.0 | 24.8 |
| 0.02% Fraction IV | 1.3 | 2.0 | 1.9 | 2.4 | 2.0 |
| 0.005% Fraction IV | 1.3 | 3.2 | 3.3 | 3.5 | 6.5 |
| 0.02% P-A Prod. | 1.3 | 2.3 | 1.7 | 1.9 | 2.5 |
| 0.005% P-A Prod. | 1.3 | 4.0 | 4.9 | 7.3 | 46.5 |

*meq/Kg.

It is believed that Fractions IV and V represent closely identical materials, in a chemical sense, and that the actual antioxidant material in all of the purified compositions considered to represent the products of treated oils and then from selected specimens the oil was extracted at the outset and at successive times of storage and tested for peroxide value.

TABLE 7

STABILITY OF POTATO CHIPS FRIED IN OILS WITH AND WITHOUT ROSEMARY ANTIOXIDANT

| Fried In | Peroxide Value* of the Oil Extracted from Potato Chips After Aging at 60°C for Days | | | | | |
|---|---|---|---|---|---|---|
| | 0 | 2 | 5 | 6 | 7 | 9 |
| Sunflower Oil, no additive | 5.1 | 9.4 | 44.0 | — | 92.3 | — |
| Sunflower Oil, 0.02% Rosemary Extract | 5.4 | 5.1 | 16.7 | — | 25.1 | — |
| Sunflower Oil, 0.02% P-A Prod. | 5.8 | 8.1 | 32.4 | — | 67.6 | — |
| 50% Sunflower Oil, 50% Corn Oil, no additive | 4.0 | 7.6 | — | 46.7 | — | 113.0 |
| 50% Sunflower Oil, 50% Corn Oil, 0.02% Rosemary Extract | 4.5 | 5.4 | — | 25.1 | — | 73.2 |
| 50% Sunflower Oil, 50% Corn Oil, 0.02% P-A Prod. | 5.5 | 6.3 | — | 40.5 | — | 100.9 |

*meq/Kg.

Although soybean oil is one of the most commonly used edible oils in the world, it has a disadvantage in that it rapidly develops an undesirable beany and grassy flavor, known as reversion flavor, during storage. In addition, when soybean oil is used for frying it usually develops an undesirable fishy odor. Therefore, the product oils of this type commonly sold in the market are hydrogenated and winterized soybean oil. This process is not only costly, but it also introduces a new undesirable flavor being a hydrogenation flavor, into the product.

It was found that the rosemary antioxidant not only can delay the development of the reversion flavor in soybean oil, but also can significantly decrease the fishy odor when it is used for frying. It therefore appears that with the use of the rosemary antioxidant, the hydrogenation and winterization of soybean oil, which are commonly practiced by the industry, might be omitted. These results were experimentally demonstrated by the following tests, which can be taken to represent examples of the special procedures of the invention respecting the treatment and use of soybean oil.

Test A.

Soybean oil was aged in 8 oz. clear glass bottles under diffused daylight at room temperature. The bottles were filled up to the narrow neck and closed with a screw cap. One sample was freshly deodorized soybean oil, and the other was the same oil with 0.02% of the rosemary antioxidant added. The oils were analyzed for peroxide value, as well as evaluated by an organoleptic panel for their flavor, at different intervals of time. The flavor score in each case represents the average of the individual scoring by the persons on the panel. The results are shown in Table 8.

have each been found to have certain synergistic effects with chemical antioxidants such as BHA and BHT, e.g. in enhancement of the function of inhibiting oxidation in fats and oils. It has been found that the antioxidant property of the highly pure products of the present invention, e.g. derived from rosemary or sage, can be enhanced by the addition of ascorbic acid, or alternatively by the addition of citric acid.

Comparisons of rosemary extract and its preparations with antioxidant now commercially available on the market are shown in Tables 2 and 3 as to the crude product and mot significantly in Tables 4, 6 and 7 as to the purified product of this invention. The product particularly used for this purpose, herein called P-A Prod., has been considered very effective, and has a composition as given in a note to Table 2. When comparing the antioxidant activity of the rosemary extract with commercial products containing an agent which is synergistic in antioxidant effect, it must be remembered that the antioxidant property of the rosemary preparations will be significantly increased if an agent functioning synergistically such as citric or ascorbic acid, is similarly added.

Experimental operations have shown that essentially the same results are obtained by treatment of sage, for example, the ordinary spice material described above and utilized in the form of dried leaves and stems. Thus, by extracting the dried sage plant material (for example Salvia officinalis L.) with various low boiling solvents, corresponding crude extracts were obtained as in the situation of the extracts from rosemary. These crude extracts after bleaching were utilized for determining their antioxidant value with lard, the result being shown in Table 9 and indicating effective antioxidant properties. These crude extracts can be treated, in the second

TABLE 8

IMPROVEMENT OF THE FLAVOR STABILITY OF SOYBEAN OIL WITH THE USE OF THE ROSEMARY ANTIOXIDANT
Flavor Stability After Days at Room Temperature

| Sample | 0 | | 14 | | 21 | | 35 | |
|---|---|---|---|---|---|---|---|---|
| | Flavor Score* | Peroxide Value | Flavor Score | Peroxide Value | Flavor Score | Peroxide Value | Flavor Score | Peroxide Value |
| Soybean Oil | 8.5 | 0.3 | 3.5 | 1.7 | 3.0 | — | 3.0 | 5.1 |
| Soybean Oil + 0.02% Rosemary Antioxidant | 8.5 | 0.3 | 5.5 | 0.6 | 5.6 | — | 5.5 | 1.9 |

*Hedonic Scale, 0–10, the higher the score, the better the flavor.

Test B.

Two electrically self-heated household frying pans were each filled with a 1/2 inch layer of soybean oil. One contained no additive and the other contained 0.02% of bleached and 180°C. deodorized rosemary antioxidant, i.e. the purified antioxidant of this invention. The two frying pans were covered and then heated to 185°C. After 5 minutes, the covers were removed and the oils were smelled by a panel. The results clearly demonstrated that the soybean oil containing the rosemary antioxidant was more pleasant and had practically no fishy odor, while the soybean oil containing no antioxidant had an objectionable fishy odor.

It has been found that in use the novel antioxidant compositions can be suitably available in forms desired by the food industry, e.g. in vegetable oil solution, and can be accompanied by certain food-type agents which have been found useful with the chemical antioxidants of present employment. Thus ascorbic and citric acid stage of the procedure, by any one of the various distillation and chromatographic operations described above, in the same way and under the same conditions as for the crude rosemary extracts, with like results, i.e. providing substantially tasteless and odorless products (purified sage extracts), of useful antioxidant effect and properties similar to the purified products from rosemary.

TABLE 9

ANTIOXIDANT PROPERTY OF CRUDE EXTRACT OF SAGE BY DIFFERENT SOLVENTS
Peroxide Value of Prime Steam Lard
(Days at 60°C)

| Additives | 0 | 4 | 8 | 12 |
|---|---|---|---|---|
| Control (No additive) | 2.25 | 8.02 | 23.09 | 56.41 |
| 0.02% Methanol Extract | 2.25 | 2.94 | 3.53 | 4.39 |
| 0.02% Chloroform Extract | 2.25 | 3.43 | 4.06 | 4.38 |
| 0.02% Acetone Extract | 2.25 | 3.31 | 4.61 | 6.16 |
| 0.02% Ethyl Ether Extract | 2.25 | 3.16 | 4.24 | 5.23 |
| 0.02% Benzene Extract | 2.25 | 3.95 | 7.46 | 13.68 |

TABLE 9-continued
ANTIOXIDANT PROPERTY OF CRUDE EXTRACT
OF SAGE BY DIFFERENT SOLVENTS
Peroxide Value of Prime Steam Lard
(Days at 60°C)

| Additives | 0 | 4 | 8 | 12 |
|---|---|---|---|---|
| 0.02% Hexane Extract | 2.25 | 7.55 | 21.48 | 61.87 |

The exceptional utility and effectiveness of the antioxidant products of this invention have been demonstrated by extensive tests, including those reported in a number of the above tables. Unusual advantage, as also explained, has been achieved in the situation of so-called deep fat frying, which can be taken to mean cooking procedures where a food product is cooked in contact (usually by submergence) with an edible cooking material of the class consisting of fats and oils, the latter material being utilized at a high temperature (and thus in fluid condition) for cooking effect, and the procedure being such (e.g. by reason of submergence in the fluid fat) that the food product comes to contain, i.e. to absorb and retain, a quantity of the fat or oil used. The described high temperature can be as is customary for deep frying, commonly substantially above the normal boiling point of water, and preferably in a range upwards of 150°C, e.g. to 230°C, temperatures of 170°C to 190°C being most usually employed, and values of 180° – 190°C being representative.

As stated, tests revealed that the present invention, e.g. the purified and refined antioxidant from rosemary, is significantly more effective in stabilizing deep fried food products and the like than prior chemical antioxidants. Thus where the fat or oil has been treated by adding an effective, small amount of the present antioxidant, the cooked food product containing the oil after heating, and thus containing the antioxidant, is better preserved, and in particular the oil in the food undergoes much less or much slower rise in peroxide value, than is the case where prior, chemical antioxidants such as BHA and BHT are used. The invention thus extends to improve cooking procedures and improved cooked products, utilizng the new antioxidants. These results apply to a wide variety of fats and oils, and are of special advantage in the case of vegetable oils where even in non-cooking uses the previous chemical agents have been less than wholly satisfactory.

Deep frying or the like with soybean oil is in a special, further sense more successful with the present antioxidants, in that there is not only the foregoing improvement in stabilization of the resulting food product (e.g. a product which might be deep fried in the heated oils of Test B above), but there is, as also described above, an avoidance of a fishy odor that has heretofore developed in cooked soybean oil. Indeed, because of this and other advantages as explained, soybean oil treated by inclusion of an effective amount of the new antioxidant can be considered a new product.

In general for the retardation of oxidation or like deterioration in various materials, i.e. oils and fats (including treatment of soybean oil as described, as well as other oils and fats in general), it is found that the purified and refined antioxidant product (from rosemary or sage) is usually effective to a considerable degree in quantities as small as about 0.005% (by weight) of the treated material, being the oil or fat itself. Amounts of about 0.01% are somewhat preferred, and in most cases, highly useful and sufficient results are attained with quantities of about 0.02% or more. Larger concentrations may conceivably be desired in some cases, and although there does not presently appear to be any functional reason for an upper limit, at least below ten times the figure last named, economic considerations and conventional practices in the food industry would ordinarily require that the proportion of the additive, taken by itself, be not more than about 0.1% of the oil or the like. As indicated above, the antioxidant can be prepared in solution in an oil, such as any of the food-type oils mentioned above as useful vehicles in the purification stage. The food industry can employ such preparations containing as little as 1% antioxidant, in that then only 2% of the preparation is usually needed for addition to an oil that requires treatment. Somewhat higher concentrations of active additive dissolved in the carrier oil are possible, while retaining the mixing advantage of using a carrier, perhaps up to 50%, but ordinarily not more than about 30%. Alternatively, of course, the new antioxidant products (from rosemary or sage) can be produced free or substantially free of oil or other carrier (but then apt to be somewhat less free of odor), when it is desired to supply or use them in such state.

It is to be understood that the invention is not limited to the embodiments herein set forth, but may be carried out in other ways without departure from its spirit.

We claim:

1. A method of producing an antioxidant composition from plant material which is of the class consisting of rosemary and sage and which contains antioxidant material, comprising:
    a. treating said plant material with a first, organic solvent which is a low-boiling solvent having a boiling point not over about 100°C, to extract from said plant material, in solution in said solvent, extract materal which contains said antioxidant material and contaminating material;
    b. treating the extract solution to separate said extract material from said solvent by evaporating said solvent;
    c. dissolving the separated extract material in a second, high-boiling solvent which vaporizes at a temperature substantially higher than said first solvent, and subjecting the resulting solution to distillation treatment for recovery, by temperature-responsive separation, of a purified, substantially tasteless and odorless product comprising said antioxidant material, freed from said contaminating material which is removed in vapor state at a temperature at which said antioxidant material is in non-vapor state.

2. A method as defined in claim 1, which includes subjecting the extract material, while in solution in a solvent, to bleaching action by an adsorbent material.

3. A method as defined in claim 1, in which the high-boiling solvent is cottonseed oil.

4. A method as defined in claim 1, in which the distillation treatment of step (c) involves subjecting the solution of the extract material in the high-boiling solvent to steam distillation at a temperature which removes the contaminating material in vapor state while the antioxidant material remains in solution in the solvent.

5. A method as defined in claim 1 in which the plant material is rosemary.

6. A method as defined in claim 1, in which the antioxidant material as extracted by step (a) is also accompanied by other material which is not antioxidant but is not removable by step (c), said other material having different solubility characteristics as between polar and nonpolar solvents, than said antioxidant material; said method comprising also d. treating said antioxidant material while accompanied by said other material, after step (a) and before or after step (c), by subjecting the mixture of materials to solvents of respectively greater and less polarity and selectively effecting solution and said antioxidant material in solvent of greater polarity, substantially free of said other material.

7. A method as defined in claim 6, in which step (d) is performed before step (c), while said antioxidant material is accompanied by odor-causing contaminating material which is not removed by step (d), step (c) being thereafter performed upon the antioxidant and contaminating materials, which have been separated from the aforesaid other material.

8. A method of producing an antioxidant composition from plant material which is of the class consisting of rosemary and sage and which contains antioxidant material, comprising:

a. extracting from said plant material said antioxidant material along with other material in solution in an organic solvent; said other material having different solubility characteristics as between polar and non-polar solvents, than said antioxidant material; and b. treating said extracted materials to separate said antioxidant material physically from said contaminating material, by subjecting said mixture of materials to solvents of respectively greater and less polarity and selectively effecting solution of said antioxidant material in solvent of greater polarity, substantially free of said other material.

9. A method of producing an antioxidant composition from plant material which is spice and which contains antioxidant material, comprising:

a. treating said plant material with a first, organic solvent to extract therefrom, in solution in said solvent, extract material which contains said antioxidant material and contaminating material, said solvent being a low-boiling solvent selected from the class consisting of hexane, benzene, ethyl ether, chloroform, ethyl dichloride, dioxane and alcohols;

b. treating the extract solution to separate said extract material from said first solvent by evaporation of the solvent;

c. dissolving the separated extract material in a second, high-boiling solvent selected from the class consisting of propylene glycol, butylene glycol, cottonseed oil, coconut oil, hydrogenated soybean oil, beef tallow, corn oil, sunflower oil lard, and peanut oil, and subjecting the resulting solution to distillation treatment for recovery, by temperature-responsive separation, of a purified, substantially tasteless and odorless product comprising said antioxidant material, freed from said contaminating material which is removed in vapor state at a temperature at which said antioxidant material is in non-vapor state.

10. A method as defined in claim 9, which includes subjecting said antioxidant material, while dissolved in an organic solvent, to treatment with an adsorbent for bleaching and further diminishing taste.

11. A method as defined in claim 10, in which the spice is rosemary, the second solvent is cottonseed oil, and the adsorbent is active carbon.

* * * * *